UNITED STATES PATENT OFFICE.

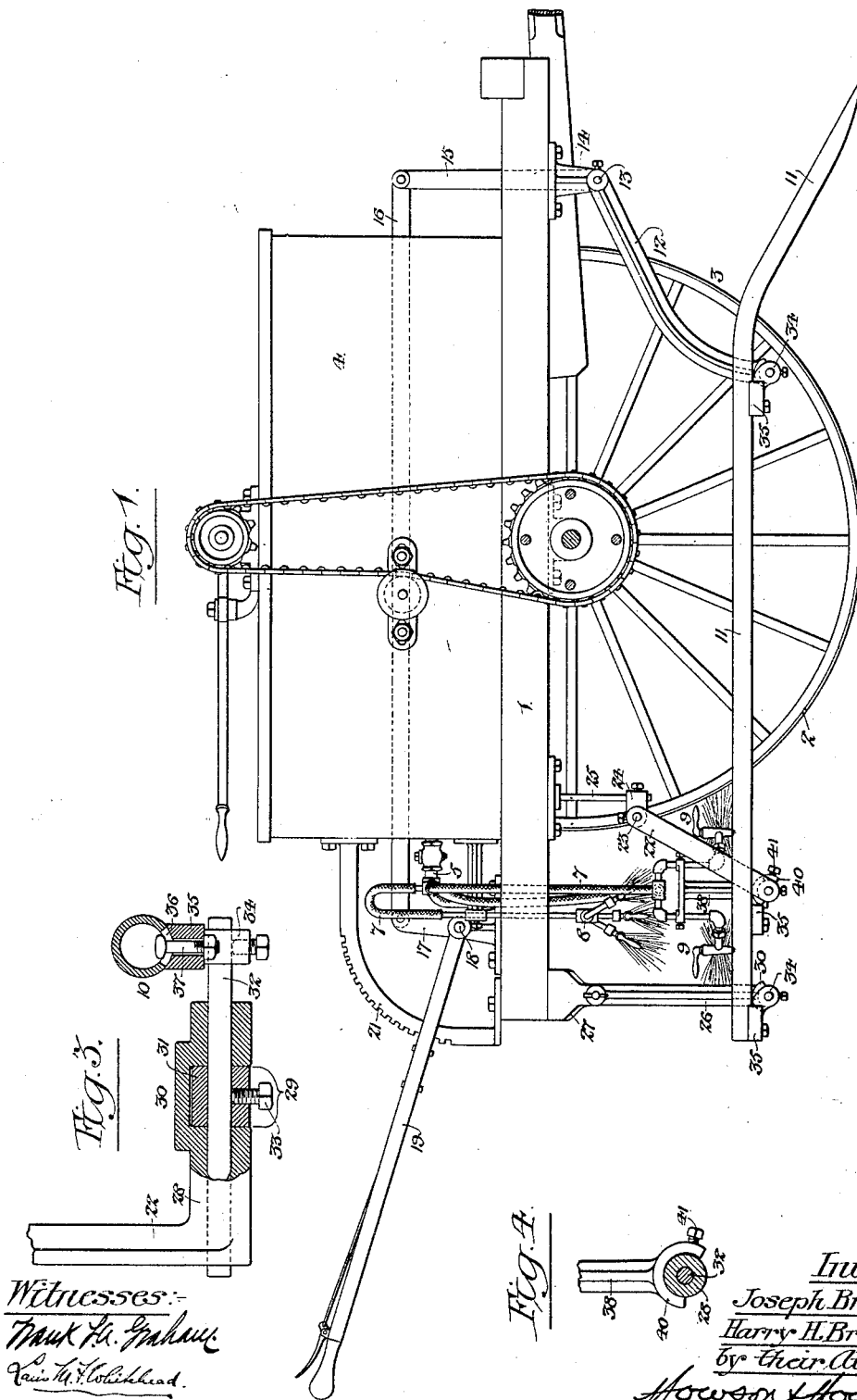

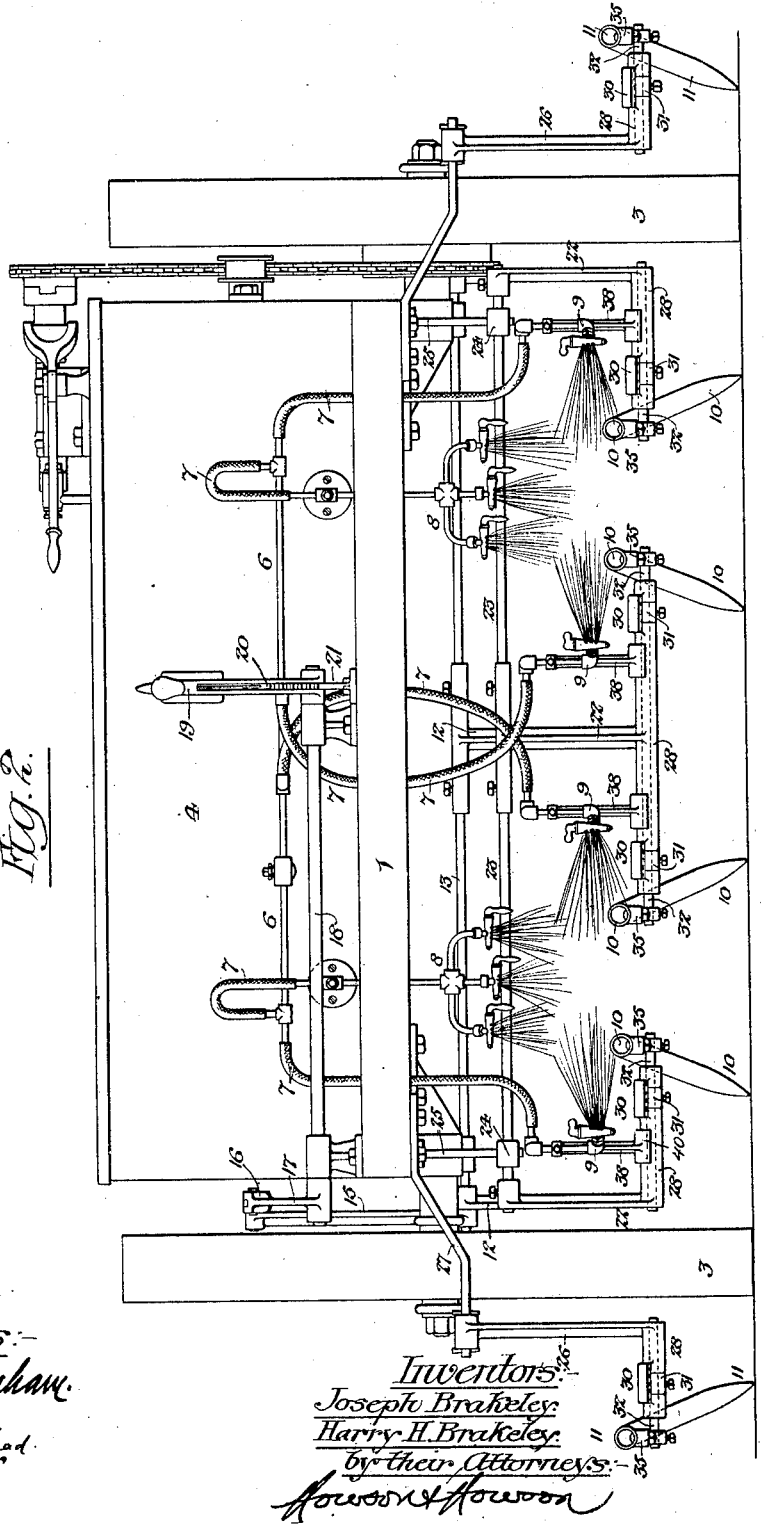

JOSEPH BRAKELEY, OF FREEHOLD, AND HARRY H. BRAKELEY, OF BORDENTOWN, NEW JERSEY.

VINE-SPRAYING MACHINE.

SPECIFICATION forming part of Letters Patent No. 668,951, dated February 26, 1901.

Application filed November 7, 1900. Serial No. 35,756. (No model.)

*To all whom it may concern:*

Be it known that we, JOSEPH BRAKELEY, of Freehold, Monmouth county, and HARRY H. BRAKELEY, of Bordentown, Burlington county, New Jersey, citizens of the United States, have invented certain Improvements in Vine-Spraying Machines, of which the following is a specification.

Our invention consists of certain improvements in the spraying-machine for which we filed application for Letters Patent on the 9th day of July, 1900, Serial No. 22,999, the objects of our present invention being to simplify the construction of the vine-lifters and of the mechanism for raising and lowering the same, to provide for the raising and lowering of the side spraying devices simultaneously with a like movement of the vine-lifters, and to hold the vines out of the way of the wheels of the machine. These objects we attain in the manner hereinafter set forth, reference being had to the accompanying drawings, in which—

Figure 1 is a side elevation of our improved spraying-machine with the near wheel removed. Fig. 2 is an end elevation of the machine. Fig. 3 is an enlarged transverse section of one of the lifter-bar supports, and Fig. 4 is an enlarged section of part of one of the sprayer-supports.

The general construction of the machine is similar to that forming the subject of the before-mentioned application for Letters Patent, 1 representing the fixed frame, 3 the supporting and driving wheels, and 4 the elevated tank, the machine also having the same means as before for operating the pump in the tank, so as to supply spraying liquid under pressure to a valved pipe 5, which communicates with a manifold pipe 6, having branches connected by flexible pipes 7 to two sets of top sprayers 8 and four side sprayers 9, so that the spraying liquid may be directed from above and from each side upon two rows of plants.
There are in the present instance two pairs of vine-lifting bars—that is to say, a pair of bars 10 for each row of plants, one bar of the pair on each side of the row—and there are also two lifter-bars 11, one outside of each wheel of the machine, so as to direct away from said wheel any plants which may have been thrown down in front of the same, thus preventing the crushing of such plants by the wheels as the machine is drawn along the rows. Instead of being supported upon slides or runners resting upon the ground, however, the lifter-bars 10 and 11 are in the present instance suspended from the fixed frame of the machine, so as to be raised or lowered and supported in any desired position of vertical adjustment.

Each lifter-bar consists, by preference, of a tube, such as an ordinary gas-pipe, bent downward at the forward end, as shown in Fig. 1, and also bent outward or away from the row of plants, as shown in Fig. 2, the front end of each bar being also, by preference, beveled or pointed, so as to readily enter beneath vines lying upon the ground on either side of the normal line of the row, so as to lift said vines into proper position for receiving the spray from the side spraying devices.

Each of the bars 10 and 11 is supported as to its forward end by means of arms 12 upon a rock-shaft 13, mounted in brackets 14 on the fixed frame of the machine and having another arm 15, which is connected by a rod or bar 16 to an arm 17 upon a rock-shaft 18, mounted in bearings at the rear of the machine and provided with an operating-arm 19, which has a suitable locking-bolt 20 for engagement with a notched quadrant 21 on the frame of the machine, so that by manipulation of said arm 19 the forward ends of the lifter-bars 10 and 11 can be readily raised or lowered and supported in any desired position of vertical adjustment.

The rear ends of the bars 10 are supported by arms 22, depending from a rock-shaft 23, which is adapted to bearings in blocks 24, vertically adjustable upon rods 25, depending from the fixed frame of the machine, and the rear ends of the outer lifters 11 are supported upon arms 26, hung to brackets 27, which project outwardly from the fixed frame of the machine behind the supporting-wheels 3 of the same.

Each of the arms 12, 22, and 26 has secured to or forming part of the lower end of the same a laterally-projecting tube 28, with gap 29 therein, bridged at the top by a bar or plate 30, and snugly fitting in this gap is a ring or washer 31, through which, as well as through the tube 28, passes a stem 32, to which the ring can be secured by means of a set-screw 33, the outer projecting end of this stem being secured to a bracket 34 on a block 35, upon which is mounted the tubular lifter-bar 10 or 11, the latter having in its lower portion a segmental slot 36 for the reception of a securing-bolt 37, passing through the block 35, as shown in Fig. 3. By loosening the nut upon this bolt 37, therefore, the tubular lifting-bar 11 can be partially turned around its axis, so as to swing laterally in either direction the downwardly-bent forward end of the lifter-bar, while by loosening the set-screw 33, which confines the stem 32 to the ring or washer 31, said stem can be adjusted laterally through said ring or washer, so as to move the lifter-bar bodily from or toward the row of plants.

The tubes 28, which carry the lifters 10, also have mounted upon them standards 38, in which are supported the stems of the side sprayers 9, so that any vertical adjustment of the lifters 10 is accompanied by a corresponding vertical adjustment of the side sprayers, the latter being also adjustable vertically in the standards 38, so as to be capable of vertical adjustment independently of the lifters.

Each standard 38 has at the lower end a segmental foot 40, partially embracing the tube 28 and secured thereto by a set-screw 41, as shown in Fig. 4, so that the standards are adjustable laterally on said tubes and can be secured in position after any such adjustment.

Having thus described our invention, we claim and desire to secure by Letters Patent—

1. The combination in a vine-spraying machine, of a wheeled frame, vine-lifting bars suspended therefrom, and means for adjusting said suspending devices and securing them in different positions of adjustment, whereby the lifting-bars can be raised or lowered as desired, substantially as specified.

2. The combination in a vine-spraying machine, of a wheeled frame, vine-lifting bars supported at the front ends upon arms on a rock-shaft combined with means for imparting positive movement thereto, the rear ends of the lifting-bars being mounted upon arms which are free to swing as the forward supporting-arms are vibrated, substantially as specified.

3. The combination in a vine-spraying machine, of a wheeled frame with lifter-bars each comprising a horizontal run with downwardly and laterally bent forward end, and means for suspending said bars from the fixed frame of the machine, substantially as specified.

4. The combination in a vine-spraying machine, of a wheeled frame, vine-lifting bars mounted upon said frame so as to be raised and lowered in respect thereto, and spraying devices carried by and movable with said adjusting devices for the vine-lifters, substantially as specified.

5. The combination in a vine-spraying machine, of a wheeled frame, vine-lifting bars mounted upon said frame so as to be raised and lowered in respect thereto, and spraying devices carried by and movable with said adjusting devices for the vine-lifters, but adjustable vertically independently thereof, substantially as specified.

6. The combination in a vine-spraying machine, of a wheeled frame, vine-lifting bars mounted upon said frame, so as to be raised and lowered in respect thereto, and spraying devices carried by and movable with said adjusting devices for the vine-lifters, but adjustable laterally independently thereof, substantially as specified.

7. The combination in a vine-spraying machine, of a wheeled frame, a tubular vine-lifting bar having a segmental slot in the lower portion, and a suspending device for said bar having a block with securing-bolt passing through said segmental slot, substantially as specified.

8. The combination in a vine-spraying machine, of a wheeled frame, a vine-lifting bar, and a suspending device therefor, having a tubular projection for receiving a stem upon which said vine-lifting bar is mounted, and means for securing said stem in said tubular projection in different positions of lateral adjustment, substantially as specified.

9. The combination in a vine-spraying machine, of a wheeled frame, a vine-lifting bar, a suspending device therefor having a tubular projection with gap therein, a ring or washer in said gap, a stem supporting the vine-lifting bar, and passing through said tubular projection and ring or washer, and means for securing said stem to the ring or washer, substantially as specified.

In testimony whereof we have signed our names to this specification in the presence of the subscribing witnesses.

JOSEPH BRAKELEY.
HARRY H. BRAKELEY.

Witnesses to signature of Jos. Brakeley:
F. E. BECHTOLD,
JOS. H. KLEIN.

Witnesses to signature of Harry H. Brakeley:
CHARLES H. LEWIS,
SAMUEL E. BURR.